United States Patent
Chang

(10) Patent No.: US 10,241,619 B2
(45) Date of Patent: Mar. 26, 2019

(54) TOUCH SENSITIVE PROCESSING APPARATUS AND ELECTRONIC SYSTEM FOR DETECTING WHETHER TOUCH PANEL IS MOSTLY COVERED BY CONDUCTIVE LIQUID OR OBJECT AND METHOD THEREOF

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 188 days.

(21) Appl. No.: 15/343,410

(22) Filed: Nov. 4, 2016

(65) Prior Publication Data

US 2017/0131841 A1 May 11, 2017

Related U.S. Application Data

(60) Provisional application No. 62/251,827, filed on Nov. 6, 2015.

(51) Int. Cl.
G06F 3/045 (2006.01)
G06F 3/041 (2006.01)
G06F 3/044 (2006.01)

(52) U.S. Cl.
CPC ............ G06F 3/0418 (2013.01); G06F 3/044 (2013.01); *G06F 2203/04104* (2013.01)

(58) Field of Classification Search
CPC ........ G06F 3/0418; G06F 3/041; G06F 3/044; G06F 2203/04104
See application file for complete search history.

(56) References Cited

U.S. PATENT DOCUMENTS

| | | | |
|---|---|---|---|
| 8,976,153 B2 | 3/2015 | Toda et al. | |
| 9,839,103 B2* | 12/2017 | Avrahamy | ................ C02F 1/42 |
| 9,867,263 B2* | 1/2018 | Avrahamy | ......... H05B 37/0272 |
| 2017/0285867 A1* | 10/2017 | Lee | ........................ G06F 3/0418 |
| 2018/0101232 A1* | 4/2018 | Levesque | ................ G06F 3/016 |

* cited by examiner

*Primary Examiner* — Vijay Shankar
(74) *Attorney, Agent, or Firm* — WPAT, PC

(57) ABSTRACT

A touch sensitive processing apparatus is provided for detecting whether a touch panel is mostly covered by a conductive liquid or object. The apparatus includes a driving circuit for providing a driving signal to one of multiple parallel electrodes of the touch panel; a sensing circuit for sensing multiple values by the electrodes with respect to the driving signal; and a processor. The processor is configured for commanding the driving circuit to provide the driving signal and receiving the multiple sensing values from the sensing circuit; calculating a maximum difference between the largest and the smallest values of the sensing values; and if the maximum difference is less than a threshold, then determining that the touch panel is mostly covered by a conductive liquid or object.

21 Claims, 11 Drawing Sheets

TOUCH SENSITIVE PROCESSING APPARATUS AND ELECTRONIC SYSTEM FOR DETECTING WHETHER TOUCH PANEL IS MOSTLY COVERED BY CONDUCTIVE LIQUID OR OBJECT AND METHOD THEREOF

CROSS REFERENCES TO RELATED APPLICATIONS

The present application claims priority benefits of U.S. provisional patent application No. 62/251,827, filed on Nov. 6, 2015.

FIELD OF THE INVENTION

The present application is related to a processing apparatus and method for detecting whether a touch panel is mostly covered by a conductive liquid, and to a processing apparatus and method for determining touch points on a touch panel if a conductive liquid is covering most of the touch panel.

BACKGROUND OF THE INVENTION

The present application is based on the disclosure and teachings of the following applications: U.S. provisional patent application No. 61/547,186 filed on Oct. 14, 2011; U.S. patent application Ser. No. 13/650,438 filed on Oct. 12, 2012 a.k.a. US publication No. 2014/0,104,222; U.S. patent application Ser. No. 13/650,649 filed on Oct. 12, 2012 a.k.a. US publication No. 2013/0,038,573; and U.S. patent application Ser. No. 13/650,683 filed on Oct. 12, 2012 a.k.a. US publication No. 2013/0,038,574.

In the present application, the term "touch panel" is used to encompass both a touch screen and a touch panel. Referring to FIG. 1, a schematic diagram illustrating electrodes of a touch panel 100 is shown in the upper half (a) of the drawing. The touch panel 100 includes a plurality of first electrodes 110 and a plurality of second electrodes 120. The first and second electrodes form a plurality of intersections. A touch sensitive processing apparatus is connected to the plurality of first electrodes 110 and the plurality of second electrodes 120 for performing various driving and sensing processes. In an embodiment, the touch panel 100 also includes shielding electrodes (not shown).

Based on the disclosure of the above applications, the touch sensitive processing apparatus may simultaneously drive all of the first electrodes 110, or even the shielding electrodes, and perform sensing based on the mutual capacitive coupling signals of all of the second electrodes 120. When a conductive liquid is covering a small area of the touch panel 100, it may cause the sensing values to reflect positive-touch and negative-touch information. If the sensing information only includes negative-touch information but not positive-touch information, then it can be determined that the touch panel 100 is covered by the conductive liquid. When positive-touch information exists on the edge of negative-touch information, then it can also be determined that the touch panel 100 is covered by the conductive liquid. When the touch panel 100 is covered by a conductive liquid, the touch sensitive processing apparatus may initiate several responses; for example, it may warn the operating system to ignore the area covered by the conductive liquid and refrain from reporting touch/proximity events within that area, or stop the touch sensitive processing operations.

In addition to an area covered by a conductive liquid being too large, there is the possibility that a large conductive object is placed on the touch panel 100, covering many of the intersections. For example, a modern induction cooker may use the touch panel 100 as an input. However, a user may accidently place an iron pan or other cooking utensils on the touch panel 100, or boiling water on the induction cooker may have spilt onto the touch panel, which may lead to misjudgments of the touch sensitive processing apparatus. If the result of a misjudgment is to turn on or increase the power of the induction cooker, serious accident or dangerous situations may occur.

Therefore, a method and apparatus for detecting if a touch panel is mostly covered by a conductive object is needed and can be used to detect if the touch panel is covered by a conductive object or liquid more than a certain percentage, which can be used in turn to disable reporting of touch points or to adopt another touch sensitive processing method if it is the case. Moreover, a touch sensitive processing method and apparatus that allows one-finger operations and two-finger scaling operations on a touch panel that is mostly covered by a conductive object.

SUMMARY OF THE INVENTION

The present application provides a touch sensitive electronic system for detecting if a touch panel is mostly covered by a conductive liquid or object, which may include: the touch panel; and a touch sensitive processing apparatus including: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit, calculating a maximum difference between the largest value and the smallest value among the sensing values, and determining that an area having the plurality of electrodes on the touch panel is covered by a large-area conductive liquid or object if the maximum difference is less than a threshold.

The present application provides a touch sensitive processing apparatus for detecting if a touch panel is mostly covered by a conductive liquid or object, which may include: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit, calculating a maximum difference between the largest value and the smallest value among the sensing values, and determining that an area having the plurality of electrodes on the touch panel is covered by a large-area conductive liquid or object if the maximum difference is less than a threshold.

The present application provides a touch sensitive electronic system for detecting if a touch panel is mostly covered by a conductive liquid or object, which may include: the touch panel; and a touch sensitive processing apparatus including: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; calculating a difference between each of the sensing values and its corresponding base value; calculating a maximum difference between the largest difference and the smallest difference in the plurality of differences; and determining that an area having the plurality of electrodes on the touch panel is covered by a large-area conductive liquid or object if the maximum difference is less than a threshold.

The present application provides a touch sensitive processing apparatus for detecting if a touch panel is mostly covered by a conductive liquid or object, which may include: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; calculating a difference between each of the sensing values and its corresponding base value; calculating a maximum difference between the largest difference and the smallest difference in the plurality of differences; and determining that an area having the plurality of electrodes on the touch panel is covered by a large-area conductive liquid or object if the maximum difference is less than a threshold.

The present application provides a touch sensitive electronic system for detecting if a touch panel is mostly covered by a conductive liquid or object, which may include: the touch panel; and a touch sensitive processing apparatus including: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit, determining if the sensing values are able to construct a quadratic curve, and determining that an area having the plurality of electrodes on the touch panel is covered by a large-area conductive liquid or object if the sensing values are unable to construct a quadratic curve.

The present application provides a touch sensitive processing apparatus for detecting if a touch panel is mostly covered by a conductive liquid or object, which may include: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit, determining if the sensing values are able to construct a quadratic curve, and determining that an area having the plurality of electrodes on the touch panel is covered by a large-area conductive liquid or object if the sensing values are unable to construct a quadratic curve.

The present application provides a touch sensitive electronic system for detecting if a touch panel is mostly covered by a conductive liquid or object, which may include: the touch panel; and a touch sensitive processing apparatus, which may include: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; calculating a difference between each of the sensing values and its corresponding base value; determining if the differences are able to construct a quadratic curve; and determining that an area having the plurality of electrodes on the touch panel is covered by a large-area conductive liquid or object if the differences are unable to construct a quadratic curve.

The present application provides a touch sensitive processing apparatus for detecting if a touch panel is mostly covered by a conductive liquid or object, which may include: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; calculating a difference between each of the sensing values and its corresponding base value; determining if the differences are able to construct a quadratic curve; and determining that an area having the plurality of electrodes on the touch panel is covered by a large-area conductive liquid or object if the differences are unable to construct a quadratic curve.

The present application provides a touch sensitive processing method for detecting if a touch panel is mostly covered by a conductive liquid or object, which may include the following steps of: providing a driving signal to one of a plurality of electrodes arranged in parallel on the touch panel; detecting sensing values of the plurality of electrodes in response to the driving signal; calculating a maximum difference between the largest value and the smallest value among the sensing values; and determining that an area having the plurality of electrodes on the touch panel is covered by a large-area conductive liquid or object if the maximum difference is less than a threshold.

The present application provides a touch sensitive processing method for detecting if a touch panel is mostly covered by a conductive liquid or object, which may include the following steps of: providing a driving signal to one of a plurality of electrodes arranged in parallel on the touch panel; detecting sensing values of the plurality of electrodes in response to the driving signal; calculating a difference between each of the sensing values and its corresponding base value; calculating a maximum difference between the largest difference and the smallest difference in the plurality of differences; and determining that an area having the plurality of electrodes on the touch panel is covered by a large-area conductive liquid or object if the maximum difference is less than a threshold.

The present application provides a touch sensitive processing method for detecting if a touch panel is mostly covered by a conductive liquid or object, which may include the following steps of: providing a driving signal to one of a plurality of electrodes arranged in parallel on the touch panel; detecting sensing values of the plurality of electrodes in response to the driving signal; determining if the sensing values are able to construct a quadratic curve; and determining that an area having the plurality of electrodes on the touch panel is covered by a large-area conductive liquid or object if the sensing values are unable to construct a quadratic curve.

The present application provides a touch sensitive processing method for detecting if a touch panel is mostly covered by a conductive liquid or object, which may include the following steps of: providing a driving signal to one of a plurality of electrodes arranged in parallel on the touch panel; detecting sensing values of the plurality of electrodes in response to the driving signal; calculating a difference between each of the sensing values and its corresponding base value; determining if the differences are able to construct a quadratic curve; and determining that an area having the plurality of electrodes on the touch panel is covered by a large-area conductive liquid or object if the differences are unable to construct a quadratic curve.

The present application provides a touch sensitive electronic system that allows one-finger operation even after determining that a touch panel is mostly covered by a large-area conductive object. The touch sensitive electronic system may include: a touch panel and a touch sensitive processing apparatus, wherein the touch sensitive processing apparatus includes: a driving circuit for providing a driving signal to a plurality of first electrodes and a plurality of second electrodes arranged in parallel on the touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area, commanding the sensing circuit to detect a plurality of second sensing values of all of the second electrodes in that area, and determining at least one second-coordinate value based on the plurality of second sensing values; commanding the driving circuit to simultaneously provide a driving signal to all of the second electrodes in that area, commanding the sensing circuit to detect a plurality of first sensing values of all of the first electrodes in that area, and determining at least one first-coordinate value based on the plurality of first sensing values; and determining that there is an external conductive object at a location of the first-coordinate value and the second-coordinate value.

The present application provides a touch sensitive processing apparatus that allows one-finger operation even after determining that a touch panel is mostly covered by a large-area conductive object. The touch sensitive processing apparatus may include: a driving circuit for providing a driving signal to a plurality of first electrodes and a plurality of second electrodes arranged in parallel on a touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area, commanding the sensing circuit to detect a plurality of second sensing values of all of the second electrodes in that area, and determining at least one second-coordinate value based on the plurality of second sensing values; commanding the driving circuit to simultaneously provide a driving signal to all of the second electrodes in that area, commanding the sensing circuit to detect a plurality of first sensing values of all of the first electrodes in that area, and determining at least one first-coordinate value based on the plurality of first sensing values; and determining that there is an external conductive object at a location of the first-coordinate value and the second-coordinate value.

The present application provides a touch sensitive electronic system that allows one-finger operation after determining that a touch panel is mostly covered by a large-area conductive object, and may include a touch panel and a touch sensitive processing apparatus, wherein the touch sensitive processing apparatus includes: a driving circuit for providing a driving signal to a plurality of first electrodes and a plurality of second electrodes arranged in parallel on the touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area; commanding the sensing circuit to detect a plurality of first sensing values of all of the first electrodes in that area, and determining at least one first-coordinate value based on the plurality of first sensing values; commanding the sensing circuit to detect a plurality of second sensing values of all of the second electrodes in that area, and determining at least one second-coordinate value based on the plurality of second sensing values; and determining that there is an external conductive object at a location of the first-coordinate value and the second-coordinate value.

The present application provides a touch sensitive processing apparatus that allows one-finger operation after determining that a touch panel is mostly covered by a large-area conductive object, and may include: a driving circuit for providing a driving signal to a plurality of first electrodes and a plurality of second electrodes arranged in parallel on the touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area; commanding the sensing circuit to detect a plurality of first sensing values of all of the first electrodes in that area, and determining at least one first-coordinate value based on the plurality of first sensing values; commanding the sensing circuit to detect a plurality of second sensing values of all of the second electrodes in that area, and determining at least one second-coordinate value based on the plurality of second sensing values; and determining that there is an external conductive object at a location of the first-coordinate value and the second-coordinate value.

The present application provides a touch sensitive electronic system that allows one-finger operation after determining that a touch panel is mostly covered by a large-area conductive object, and may include a touch panel and a touch sensitive processing apparatus, wherein the touch sensitive processing apparatus includes: a driving circuit for providing a driving signal to a plurality of first electrodes and a plurality of second electrodes arranged in parallel on the touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area; commanding the sensing circuit to detect a plurality of first sensing values of all of the first electrodes in that area, and determining at least one first-coordinate value based on the plurality of first sensing values; commanding the driving circuit to simultaneously provide a driving signal to all of the second electrodes in that area, commanding the sensing circuit to detect a plurality of second sensing values of all of the second electrodes in that area, and determining at least one second-coordinate value based on the plurality of second sensing values; and determining that there is an external conductive object at a location of the first-coordinate value and the second-coordinate value.

The present application provides a touch sensitive processing apparatus that allows one-finger operation after determining that a touch panel is mostly covered by a large-area conductive object, and may include: a driving circuit for providing a driving signal to a plurality of first electrodes and a plurality of second electrodes arranged in parallel on the touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area; commanding the sensing circuit to detect a plurality of first sensing values of all of the first electrodes in that area, and determining at least one first-coordinate value based on the plurality of first sensing values; commanding the driving circuit to simultaneously provide a driving signal to all of the second electrodes in that area, commanding the sensing circuit to detect a plurality of second sensing values of all of the second electrodes in that area, and determining at least one second-coordinate value based on the plurality of second sensing values; and determining that there is an external conductive object at a location of the first-coordinate value and the second-coordinate value.

The present application provides a touch sensitive processing method that allows one-finger operation after determining that a touch panel is mostly covered by a large-area conductive object. The touch sensitive processing method may include the following steps of: determining if an area having a plurality of first and second electrodes on a touch panel is covered by a large-area conductive liquid or object; when that area is determined to be covered by a large-area conductive liquid or object, simultaneously providing a driving signal to all of the first electrodes in that area, detecting a plurality of second sensing values of all of the second electrodes in that area, and determining at least one second-coordinate value based on the plurality of second sensing values; simultaneously providing a driving signal to all of the second electrodes in that area, detecting a plurality of first sensing values of all of the first electrodes in that area, and determining at least one first-coordinate value based on the plurality of first sensing values; and determining that there is an external conductive object at a location of the first-coordinate value and the second-coordinate value.

The present application provides a touch sensitive processing method that allows one-finger operation after determining that a touch panel is mostly covered by a large-area conductive object. The touch sensitive processing method may include the following steps of: determining if an area having a plurality of first and second electrodes on a touch panel is covered by a large-area conductive liquid or object; when that area is determined to be covered by a large-area conductive liquid or object, simultaneously providing a driving signal to all of the first electrodes in that area; detecting a plurality of first sensing values of all of the first electrodes in that area, and determining at least one first-coordinate value based on the plurality of first sensing values;, detecting a plurality of second sensing values of all of the second electrodes in that area, and determining at least one second-coordinate value based on the plurality of second sensing values; and determining that there is an external conductive object at a location of the first-coordinate value and the second-coordinate value.

The present application provides a touch sensitive processing method that allows one-finger operation after determining that a touch panel is mostly covered by a large-area conductive object. The touch sensitive processing method may include the following steps of: determining if an area having a plurality of first and second electrodes on a touch panel is covered by a large-area conductive liquid or object; when that area is determined to be covered by a large-area conductive liquid or object, simultaneously providing a driving signal to all of the first electrodes in that area; detecting a plurality of first sensing values of all of the first electrodes in that area, and determining at least one first-coordinate value based on the plurality of first sensing values; simultaneously providing a driving signal to all of the second electrodes in that area, detecting a plurality of second sensing values of all of the second electrodes in that area, and determining at least one second-coordinate value based on the plurality of second sensing values; and determining that there is an external conductive object at a location of the first-coordinate value and the second-coordinate value.

DETAILED DESCRIPTION OF THE EMBODIMENTS

The present invention is described by the following specific embodiments. However, in addition to those embodiments disclosed herein, the present invention can be widely applied to other embodiments. The scope of the present invention is not limited by these embodiments, but rather those set forth in the claims. In order to facilitate a clear description and for those skilled in the art to readily understand the contents of the present invention, some portions of the diagrams are not drawn to scale; ratios of some elements with respect to other elements are exaggerated; and some details that are not relevant to the present invention are omitted for conciseness of the diagrams.

Figure 1A:
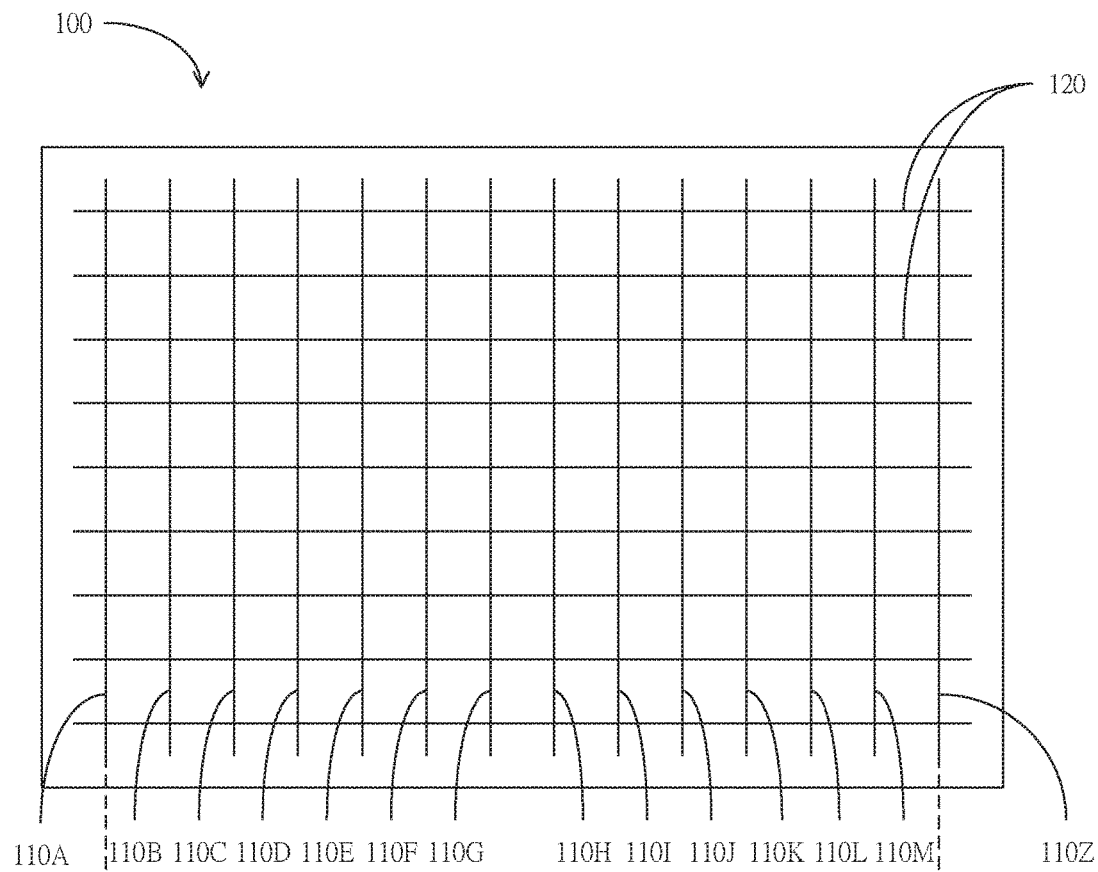
FIG. 1(*a*) is a schematic diagram depicting electrodes of a touch panel 100 and FIG. 1(*b*) is a schematic diagram depicting sensing values after the touch panel is covered by a conductive liquid or object.
Figure 1B:
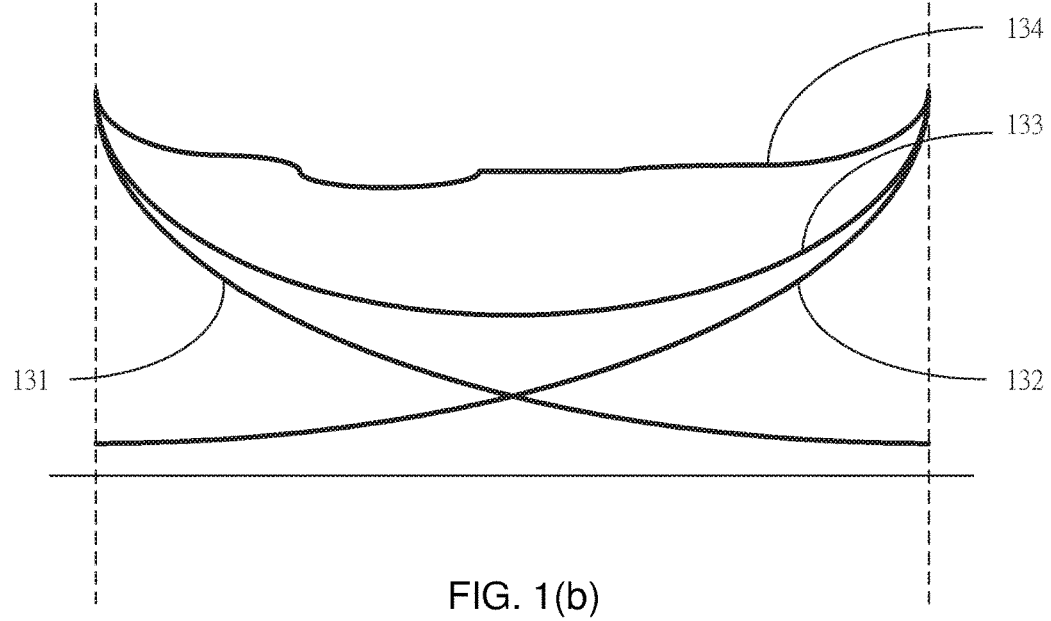

Referring back to FIG. 1, in an embodiment, a first electrode 110A is made to send out a driving signal, and the rest of the first electrodes 110B to 110Z perform sensing of this driving signal. Since electromagnetic induction occurs between each of the first electrodes 110B to 110Z and the first electrode 110A, the amount of induction is shown by a curve 131. Similarly, in another embodiment, the first electrode 110Z is made to send out the same driving signal, and the rest of the first electrodes 110A to 110M perform sensing of the driving signal. Since electromagnetic induction occurs between each of the first electrodes 110A to 110M and the first electrode 110Z, the amount of induction is shown by a curve 132. Similarly, in still another embodiment, the first electrodes 110A and 110Z are made to send out the same driving signal, while the rest of the first electrodes 110B to 110M perform sensing of the driving signal. Since electromagnetic induction occurs between each of the first electrodes 110B to 110M and the first electrodes 110A and 110Z, the amount of induction is shown by a curve 133.

If the touch panel 100 is covered by a conductive liquid or a conductive object, then the conductive liquid/object will be induced by the driving signal, and the driving signal is then propagated to the first electrodes 110 being covered. Thus, the amount of induction of each of the first electrodes 110B to 110M is directly affected by the conductive liquid/object, rather than the amount of capacitive coupling with the first electrodes 110A and/or 110Z. In the embodiment shown in FIG. 1(*b*), a line segment 134 higher than the curve 133 can be observed. This induction phenomenon is affected by the existence of the conductive liquid/object on the touch panel. The touch sensitive processing apparatus can determine if the touch panel 100 is covered by a conductive liquid/object based on the difference between this line segment 134 and the curves 131, 132 and 133.

There are several ways the touch sensitive processing apparatus can employ to carry out the above determination. A few examples are provided as follow. One with ordinary skill in the art can easily appreciate the variations and modifications thereof. In an embodiment, the touch sensitive processing apparatus may receive the sensing values of a plurality of the first electrodes 110 at one time, and determine the maximum difference between the largest and the smallest of these sensing values. When the maximum difference is less than a certain threshold, then the touch panel 100 is considered to be covered by a conductive liquid or object.

In another embodiment, the touch sensitive processing apparatus may establish a base value of each sensing value when the touch panel is not covered by a conductive liquid/object. The base values can be set at the factory or at power-on, or some other times; when these base values are set are not limited by the present application. Next, the touch sensitive processing apparatus may receive the sensing values of the plurality of first electrodes 110, and calculate the difference between each sensing value and its corresponding base value. Finally, a difference between the maximum difference and the minimum difference is obtained. If this difference is still less than a threshold, then the touch panel 100 is considered to be covered by a conductive liquid or object.

In yet another embodiment, the touch sensitive processing apparatus may receive the sensing values of a plurality of the first electrodes 110 at one time, and determine if these sensing values fit the curvature of a quadratic curve. If the curvature constructed by these sensing values is too small, or if these sensing values cannot form a quadratic curve, then the touch panel 100 is considered to be covered by a conductive liquid or object.

Although in the above embodiments, only the first electrode(s) 110A and/or 110Z at either side of the touch panel 100 send(s) out the driving signal while the rest of the parallel first electrodes 110B to 110M sense the driving signal, the present application is applicable to at least two first electrodes sending out the driving signal, while one or more first electrodes between the two driving first electrodes perform sensing. The obtained sensing values or the difference derived from the obtained sensing values can be compared with a threshold. If it is less than the threshold, then the area between these two first electrodes can be considered to be covered by a conductive liquid/object. For example, if first electrodes 110A, 110E, 110I and 110Z are made to send out the driving signal, then based on the sensing values of the first electrodes 110B to 110D, 110F to 110H, and 110J to 110M, it can be determined separately if each of the three areas formed by the four first electrodes is covered by a conductive liquid/object.

When the touch panel is determined to be covered by a conductive liquid/object, the touch sensitive processing apparatus may notify an upper-layer operating system or another hardware, and stop reporting touch points for all the areas or just the area being covered. The touch sensitive processing apparatus can also switch to another touch processing mode in order to detect the proximity or the touch of an external conductive object even when the touch panel is being mostly covered by the conductive liquid.

In the various embodiments of the present application, the touch panel may be mostly covered by a conductive liquid, or even immersed in a conductive liquid. For example, a control panel of a ship may employ a multi-purpose display for displaying functions, such as navigation, communication and system manipulations. However, when the weather is bad, sea waves or rain may spill onto the multi-purpose display. Under such circumstances, a traditional touch sensitive processing apparatus may not be able to report touch/proximity points, or erroneously report touch/proximity points, rendering the above functions inoperable. If the invention provided by the present application is employed, even under bad weather, the display can still be manipulated.

Figure 2:
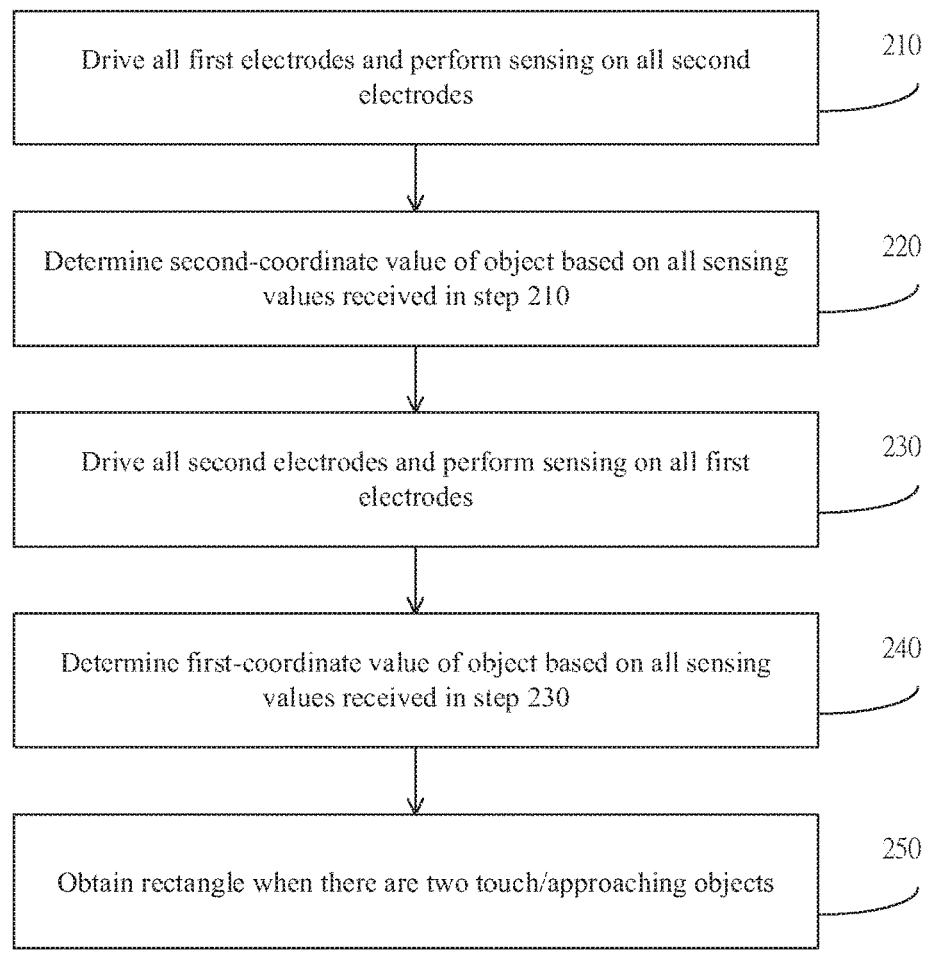
FIG. 2 is a flowchart illustrating steps for determining a touch/proximity location even under the coverage of a conductive liquid in accordance with an embodiment of the present invention.

Referring to FIG. 2, a flowchart illustrating a method for determining a touch/proximity location while a touch panel is being covered by a conductive liquid in accordance with an embodiment of the present application is shown. The present embodiment is applicable to a touch sensitive processing apparatus, which is connected to the touch panel 100 and their first electrodes 110 and second electrodes 120 shown in FIG. 1.

In step 210, the touch sensitive processing apparatus drives all of the first electrodes 110, and performs sensing on all of the second electrodes 120. In step 220, the touch sensitive processing apparatus determines any abnormality based on all of the received sensing values in step 210 in order to know which one or more of the sensing values of the second electrodes 120 is/are abnormal. Based on the abnormal sensing values, it can be determined that an object is near or on one or more second-coordinate values corresponding to the second electrodes 120. For example, in the embodiment shown in FIG. 1, one or more coordinate values on the vertical axis can be obtained.

Similarly, in step 230, the touch sensitive processing apparatus drives all of the second electrodes 120, and performs sensing on all of the first electrodes 110. In step 240, the touch sensitive processing apparatus determines any abnormality based on all of the received sensing values in step 230 in order to know which one or more of the sensing values of the first electrodes 110 is/are abnormal. Based on the abnormal sensing values, it can be determined that an object is near or on one or more first-coordinate values corresponding to the first electrodes 110. For example, in the embodiment shown in FIG. 1, one or more coordinate values on the horizontal axis can be obtained.

Once the second-coordinate values and the first-coordinate values are respectively obtained from steps 220 and 240, if only one first-coordinate and one second-coordinate are obtained, then the location of the touch/approaching object can be determined. Thus, a user is able to manipulate the touch panel with just one finger or a stylus.

If two second-coordinate values and two first-coordinate values are respectively obtained in steps 220 and 240, then in step 250, four points can be obtained based on these four coordinate values, which form a rectangle or a rhombus. In fact, only one pair of diagonal points is the real touch points, and the other pair is the ghost points. When a user draws two fingers closer to or away from each other, the touch sensitive processing apparatus can determine whether the action is two fingers drawing closer to or further away from each other based on rectangles obtained from a plurality of detections.

One with ordinary skill in the art may appreciate that in the various steps shown in FIG. 2, step 220 is dependent on step 210; step 240 is dependent on step 230; and step 250 is dependent on steps 220 and 240. The present application does not limit the order in which the independent steps are carried out. In summary, the embodiment illustrated with respect to FIG. 2 is capable of detecting a single touch point or a rectangle formed by two touch points when the touch panel is mostly or completely covered by a conductive liquid. When the embodiment of FIG. 2 is repeated, based on the lengths of the diagonals of two rectangles obtained, it can be determined if the two touch/approaching objects are getting further away from or closer to each other, and the determined "pinch-in" or "stretch-out" gesture can be used for manipulations.

Figure 3:
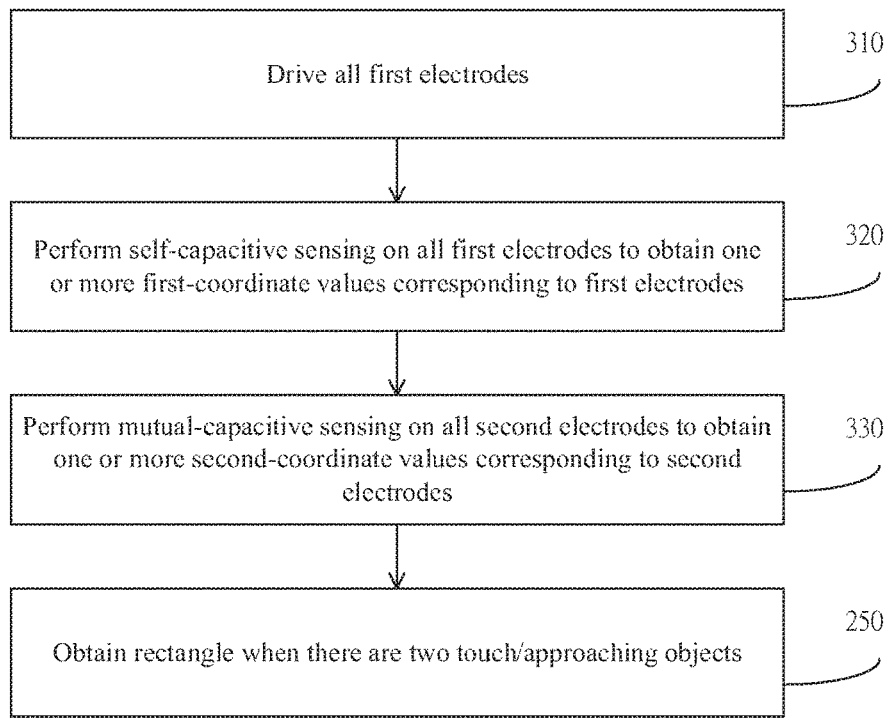
FIG. 3 is a flowchart illustrating steps for determining a touch/proximity location even under the coverage of a conductive liquid in accordance with another embodiment of the present invention.

Referring to FIG. 3, a flowchart illustrating a method for determining a touch/proximity location while a touch panel is being covered by a conductive liquid in accordance with another embodiment of the present application is shown. The present embodiment is applicable to a touch sensitive processing apparatus, which is connected to the touch panel 100 and their first electrodes 110 and second electrodes 120 shown in FIG. 1.

In step 310, the touch sensitive processing apparatus drives all of the first electrodes 110. Next, in step 320, the touch sensitive processing apparatus performs self-capacitive sensing on all of the first electrodes 110 to obtain one or more first-coordinate values corresponding to the first electrodes 110. In step 330, the touch sensitive processing apparatus performs self-capacitive sensing on all of the second electrodes 120 to obtain one or more second-coordinate values corresponding to the second electrodes 120.

Once the first-coordinate values and the second-coordinate values are respectively obtained from steps 320 and 330, if only one first-coordinate and one second-coordinate are obtained, then the location of the touch/approaching object can be determined. Thus, a user is able to manipulate the touch panel with just one finger or a stylus.

If two first-coordinate values and two second-coordinate values are respectively obtained in steps 320 and 330, then in step 250, four points can be obtained based on these four coordinate values, which form a rectangle or a rhombus. In fact, only one pair of diagonal points is the real touch points, and the other pair is the ghost points. When a user draws two fingers closer to or away from each other, the touch sensitive processing apparatus can determine whether the action is two fingers drawing closer to or further away from each other based on rectangles obtained from a plurality of detections.

Figure 4:
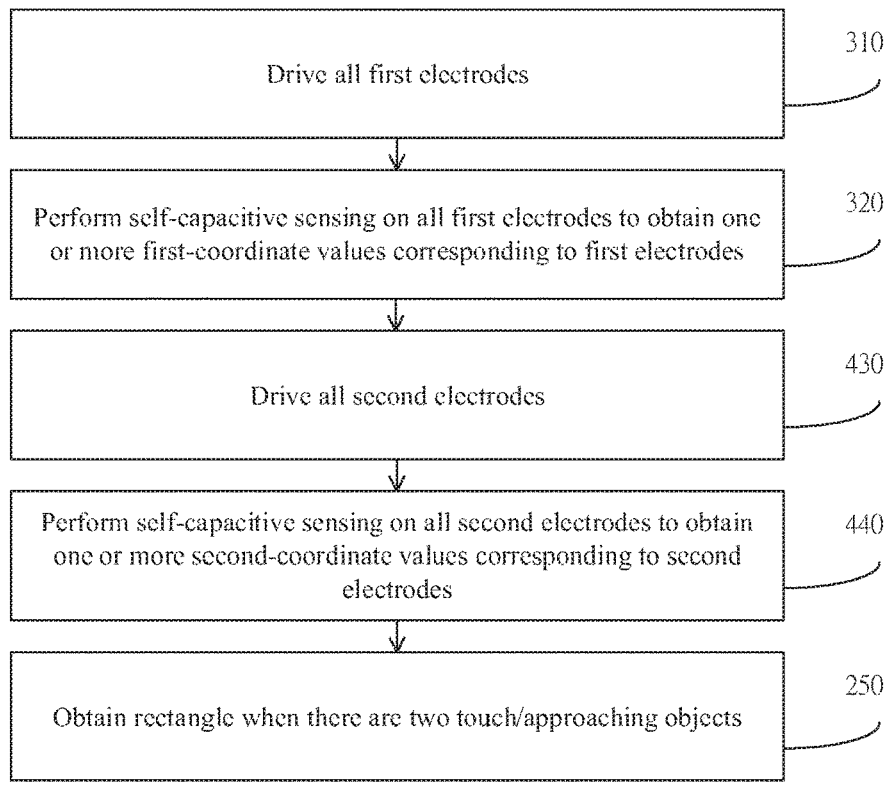
FIG. 4 is a flowchart illustrating steps for determining a touch/proximity location even under the coverage of a conductive liquid in accordance with yet another embodiment of the present invention.

Referring to FIG. 4, a flowchart illustrating a method for determining a touch/proximity location while a touch panel is being covered by a conductive liquid in accordance with still another embodiment of the present application is shown. The present embodiment is applicable to a touch sensitive processing apparatus, which is connected to the touch panel 100 and their first electrodes 110 and second electrodes 120 shown in FIG. 1.

In step 310, the touch sensitive processing apparatus drives all of the first electrodes 110. Next, in step 320, the touch sensitive processing apparatus performs self-capacitive sensing on all of the first electrodes 110 to obtain one or more first-coordinate values corresponding to the first electrodes 110.

In step 430, the touch sensitive processing apparatus drives all of the second electrodes 120. Next, in step 440, the touch sensitive processing apparatus performs self-capacitive sensing on all of the second electrodes 120 to obtain one or more second-coordinate values corresponding to the second electrodes 120.

Once the first-coordinate values and the second-coordinate values are respectively obtained from steps 320 and 440, if only one first-coordinate and one second-coordinate are obtained, then the location of the touch/approaching object can be determined. Thus, a user is able to manipulate the touch panel with just one finger or a stylus.

If two first-coordinate values and two second-coordinate values are respectively obtained in steps 320 and 440, then in step 250, four points can be obtained based on these four coordinate values, which form a rectangle or a rhombus. In fact, only one pair of diagonal points is the real touch points, and the other pair is the ghost points. When a user draws two fingers closer to or away from each other, the touch sensitive processing apparatus can determine whether the action is two fingers drawing closer to or further away from each other based on rectangles obtained from a plurality of detections.

In summary, the first part of the present application explains how to determine whether a touch panel is mostly or completely covered by a conductive liquid or object. Here, negative-touch method can be used for the determination. Alternatively, a plurality of non-adjacent electrodes can be made to send out a driving signal, and whether the touch panel is covered by a conductive liquid/object can be determined based on the sensing signals of electrodes located between those driving electrodes. When the touch panel is determined to be covered by a conductive liquid/object, no touch/proximity points in this or all of the areas are reported; alternatively, the detection method described in the second part of this application can be adopted.

The three embodiments provided in the second part of the present application explain how a single touch point or a "pinch" or "stretch" gesture indicated by two touch points can be determined when the touch panel is mostly or completely covered by a conductive liquid.

Figure 5:
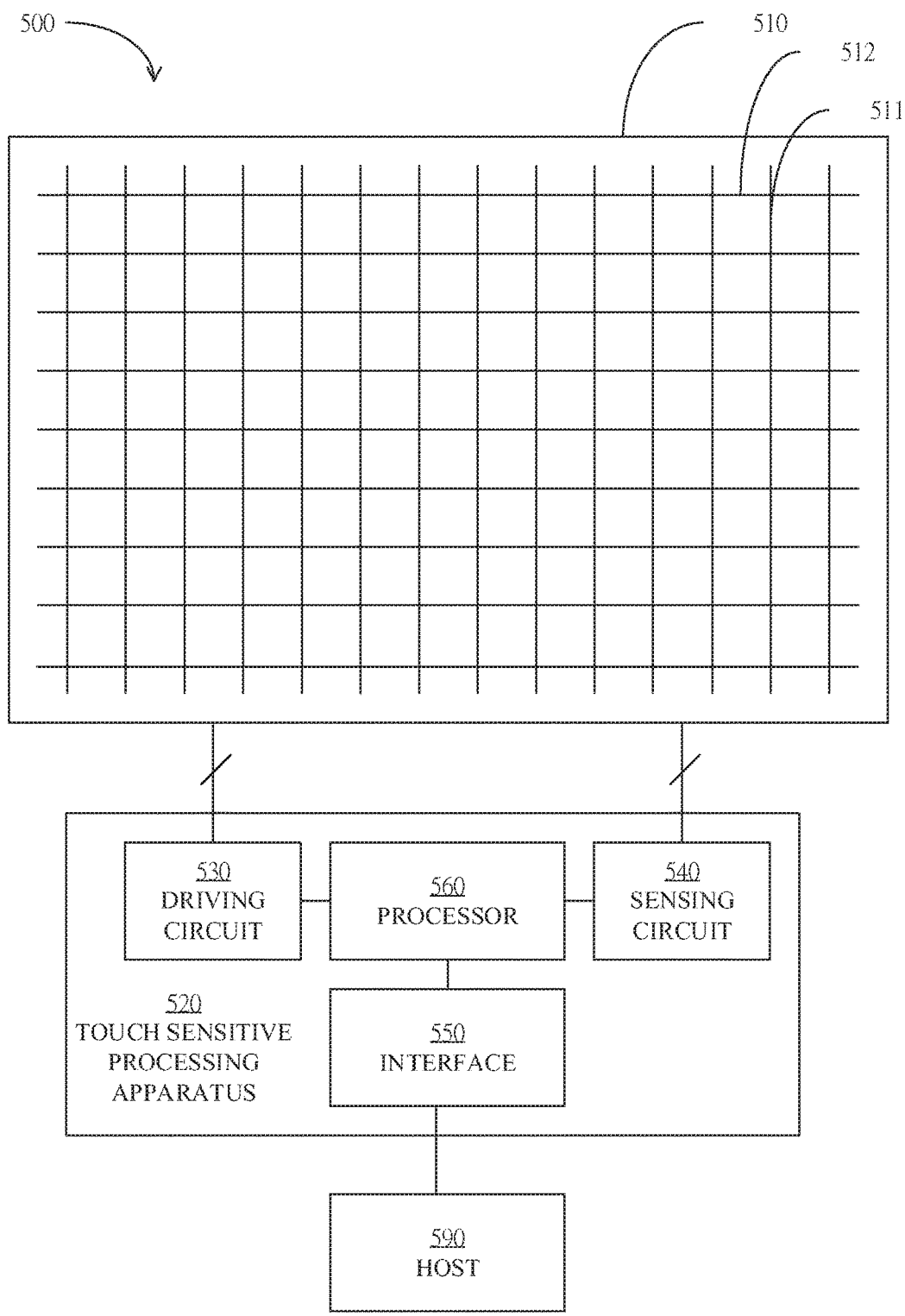
FIG. 5 is a schematic diagram depicting a touch sensitive electronic system in accordance with an embodiment of the present invention.

The touch sensitive processing apparatus of the present application can be implemented in the above method embodiments using hardware, software or a combination of the two. Referring to FIG. 5, a schematic diagram depicting a touch sensitive electronic system 500 in accordance with an embodiment of the present invention is shown. The electronic system 500 includes a touch panel 510, a touch sensitive processing apparatus 520 and a host 590. The touch sensitive processing apparatus 520 includes at least one driving circuit 530 for providing a driving signal to each of first electrodes 511 and/or second electrodes 512 shown. The touch sensitive processing apparatus 520 further includes at least one sensing circuit 540 for sensing the signal on each of the first electrodes 511 and/or the second electrodes 512. These signals can be generated based on self-capacitive sensing or mutual-capacitive sensing. The touch sensitive processing apparatus 520 further includes a processor 560 connected to the above driving circuit 530 and sensing circuit 540. The processor 560 is configured to perform specific software or firmware to implement the above embodiments using the driving circuit 530 and the sensing circuit 540. The touch sensitive processing apparatus 520 further includes an interface 550, such as USB, IEEE 1994, UART, I2C, PCI, PCI-Express, SATA, SCSI, and etc., which is connected to the host 590. The host 590 includes a host processor for controlling the electronic system 500. The host processor can execute an operating system and its associated drivers and applications and is configured to communicate with the touch sensitive processing apparatus 520. The touch sensitive processing apparatus 520 reports touch points and/or that the touch panel is mostly covered by a conductive object as described earlier to the operating system and its associated drivers and applications via the interface 550.

The present application provides a touch sensitive electronic system for detecting if a touch panel is mostly covered by a conductive liquid or object, which can be, for example, the touch sensitive electronic system 500 shown in FIG. 5, and includes a touch panel and a touch sensitive processing apparatus, wherein the touch sensitive processing apparatus includes a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; calculating a maximum difference between the largest value and the smallest value among the sensing values; and determining that an area having the plurality of electrodes on the touch panel is covered by a large-area conductive liquid or object if the maximum difference is less than a threshold.

The present application provides a touch sensitive processing apparatus for detecting if a touch panel is mostly covered by a conductive liquid or object, which can be, for example, the touch sensitive processing apparatus 520 shown in FIG. 5, and includes: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; calculating a maximum difference between the largest value and the smallest value among the sensing values; and determining that an area having the plurality of electrodes on the touch panel is covered by a large-area conductive liquid or object if the maximum difference is less than a threshold.

In order to increase the maximum difference or detect a larger area on the touch panel, the electrode driven by the driving signal can be selected as far away from the rest of the electrodes as possible, such that the difference between the amount of sensing from the furthest electrode and the amount of sensing from the closest electrode is maximized. Thus, in an embodiment, the electrode driven by the driving signal is at the outermost side of the plurality of electrodes.

In order to detect a larger area on the touch panel, if only an electrode on one side is driven by the driving signal, then electrodes on the other side may not have any sensing value. Thus, in an embodiment, the driving circuit provides a driving signal to each of the outermost electrodes on both sides of the plurality of electrodes.

In order to prevent reporting error touch sensitive events, when the processor determines that an area having the plurality of electrodes on the touch panel is covered by a large-area conductive liquid or object, it stops reporting any touch sensitive events in that area.

The present application provides a touch sensitive electronic system for detecting if a touch panel is mostly covered by a conductive liquid or object, which can be, for example, the touch sensitive electronic system 500 shown in FIG. 5, and includes: the touch panel and a touch sensitive processing apparatus, wherein the touch sensitive processing apparatus includes: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; calculating a difference between each of the sensing values and its corresponding base value; calculating a maximum difference between the largest difference and the smallest difference in the plurality of differences; and determining that an area having the plurality of electrodes on the touch panel is covered by a large-area conductive liquid or object if the maximum difference is less than a threshold.

The present application provides a touch sensitive processing apparatus for detecting if a touch panel is mostly covered by a conductive liquid or object, which can be, for example, the touch sensitive processing apparatus 520 shown in FIG. 5, and includes: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; calculating a difference between each of the sensing values and its corresponding base value; calculating a maximum difference between the largest difference and the smallest difference in the plurality of differences; and determining that an area having the plurality of electrodes on the touch panel is covered by a large-area conductive liquid or object if the maximum difference is less than a threshold.

In order to prevent establishing base values at a time when the touch panel is being covered, in an embodiment, the base values are established in at least one of the following time points: at a manufacturing factory of the touch sensitive processing apparatus, setting up the base values; at power-on of the touch sensitive processing apparatus, sensing the plurality of electrodes using the sensing circuit and using the sensing values as the base values; and when the processor determines that the touch panel is not touched or near any external conductive object, sensing the plurality of electrodes using the sensing circuit and using the sensing values as the base values.

In order to increase the maximum difference or detect a larger area on the touch panel, the electrode driven by the driving signal can be selected as far away from the rest of the electrodes as possible, such that the difference between the amount of sensing from the furthest electrode and the amount of sensing from the closest electrode is maximized. Thus, in an embodiment, the electrode driven by the driving signal is at the outermost side of the plurality of electrodes. In order to detect a larger area on the touch panel, if only an electrode on one side is driven by the driving signal, then electrodes on the other side may not have any sensing value. Thus, in an embodiment, the driving circuit provides a driving signal to each of the outermost electrodes on both sides of the plurality of electrodes. In order to prevent reporting error touch sensitive events, when the processor determines that an area having the plurality of electrodes on the touch panel is covered by a large-area conductive liquid or object, it stops reporting any touch sensitive events in that area.

The present application provides a touch sensitive electronic system for detecting if a touch panel is mostly covered by a conductive liquid or object, which can be, for example, the touch sensitive electronic system 500 shown in FIG. 5, and includes: the touch panel and a touch sensitive processing apparatus, wherein the touch sensitive processing apparatus includes: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; determining if the sensing values are able to construct a quadratic curve; and determining that an area having the plurality of electrodes on the touch panel is covered by a large-area conductive liquid or object if the sensing values are unable to construct a quadratic curve.

The present application provides a touch sensitive processing apparatus for detecting if a touch panel is mostly covered by a conductive liquid or object, which can be, for example, the touch sensitive processing apparatus 520 shown in FIG. 5, and includes: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; determining if the sensing values are able to construct a quadratic curve; and determining that an area having the plurality of electrodes on the touch panel is covered by a large-area conductive liquid or object if the sensing values are unable to construct a quadratic curve.

In order to avoid misjudgments, the processor is further configured to determine the curvature of the quadratic curve when the sensing values are able to construct a quadratic curve, and determine that an area having the plurality of electrodes on the touch panel is covered by a large-area conductive liquid or object if the curvature is less than a curvature threshold.

In order to increase the maximum difference or detect a larger area on the touch panel, the electrode driven by the driving signal can be selected as far away from the rest of the electrodes as possible, such that the difference between the amount of sensing from the furthest electrode and the amount of sensing from the closest electrode is maximized. Thus, in an embodiment, the electrode driven by the driving signal is at the outermost side of the plurality of electrodes. In order to detect a larger area on the touch panel, if only an electrode on one side is driven by the driving signal, then electrodes on the other side may not have any sensing value. Thus, in an embodiment, the driving circuit provides a driving signal to each of the outermost electrodes on both sides of the plurality of electrodes. In order to prevent reporting error touch sensitive events, when the processor determines that an area having the plurality of electrodes on the touch panel is covered by a large-area conductive liquid or object, it stops reporting any touch sensitive events in that area.

The present application provides a touch sensitive electronic system for detecting if a touch panel is mostly covered by a conductive liquid or object, which can be, for example, the touch sensitive electronic system 500 shown in FIG. 5, and includes: the touch panel and a touch sensitive processing apparatus, wherein the touch sensitive processing apparatus includes: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; calculating a difference between each of the sensing values and its corresponding base value; determining if the differences are able to construct a quadratic curve; and determining that an area having the plurality of electrodes on the touch panel is covered by a large-area conductive liquid or object if the differences are unable to construct a quadratic curve.

The present application provides a touch sensitive processing apparatus for detecting if a touch panel is mostly covered by a conductive liquid or object, which can be, for example, the touch sensitive processing apparatus 520 shown in FIG. 5, and includes: a driving circuit for providing a driving signal to one of a plurality of electrodes arranged in parallel on the touch panel; a sensing circuit for detecting sensing values of the plurality of electrodes in response to the driving signal; and a processor for commanding the driving circuit to provide the driving signal and receiving the sensing values from the sensing circuit; calculating a difference between each of the sensing values and its corresponding base value; determining if the differences are able to construct a quadratic curve; and determining that an area having the plurality of electrodes on the touch panel is covered by a large-area conductive liquid or object if the differences are unable to construct a quadratic curve.

In order to avoid misjudgments, the processor is further configured to determine the curvature of the quadratic curve when the differences are able to construct a quadratic curve, and determine that an area having the plurality of electrodes on the touch panel is covered by a large-area conductive liquid or object if the curvature is less than a curvature threshold.

In order to increase the maximum difference or detect a larger area on the touch panel, the electrode driven by the driving signal can be selected as far away from the rest of the electrodes as possible, such that the difference between the amount of sensing from the furthest electrode and the amount of sensing from the closest electrode is maximized. Thus, in an embodiment, the electrode driven by the driving signal is at the outermost side of the plurality of electrodes. In order to detect a larger area on the touch panel, if only an electrode on one side is driven by the driving signal, then electrodes on the other side may not have any sensing value. Thus, in an embodiment, the driving circuit provides a driving signal to each of the outermost electrodes on both sides of the plurality of electrodes. In order to prevent reporting error touch sensitive events, when the processor determines that an area having the plurality of electrodes on the touch panel is covered by a large-area conductive liquid or object, it stops reporting any touch sensitive events in that area.

Figure 6:
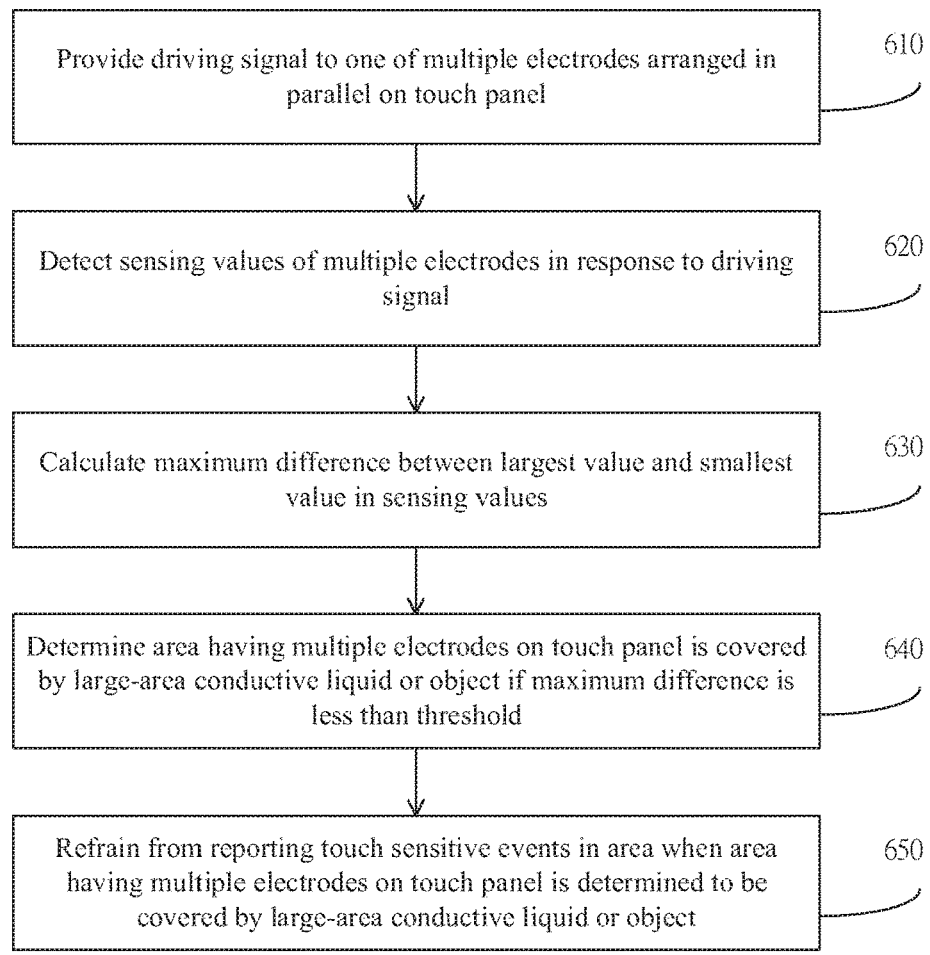
FIG. 6 is a flowchart illustrating a touch sensitive processing method in accordance with an embodiment of the present invention.

Referring to FIG. 6, a flowchart illustrating a touch sensitive processing method in accordance with an embodiment of the present invention is shown. The present application provides a touch sensitive processing method for detecting if a touch panel is mostly covered by a conductive liquid or object, which can be applicable to, for example, the touch sensitive processing apparatus 520 shown in FIG. 5, and the method includes the steps of: in step 610, providing a driving signal to one of a plurality of electrodes arranged in parallel on the touch panel; in step 620, detecting sensing values of the plurality of electrodes in response to the driving signal; in step 630, calculating a maximum difference between the largest value and the smallest value among the sensing values; and in step 640, determining that an area having the plurality of electrodes on the touch panel is covered by a large-area conductive liquid or object if the maximum difference is less than a threshold.

In order to increase the maximum difference or detect a larger area on the touch panel, the electrode driven by the driving signal can be selected as far away from the rest of the electrodes as possible, such that the difference between the amount of sensing from the furthest electrode and the amount of sensing from the closest electrode is maximized. Thus, in an embodiment, the electrode driven by the driving signal is at the outermost side of the plurality of electrodes. In order to detect a larger area on the touch panel, if only an electrode on one side is driven by the driving signal, then electrodes on the other side may not have any sensing value. Thus, in an embodiment, the touch sensitive processing method above further includes providing a driving signal to each of the outermost electrodes on both sides of the plurality of electrodes. In order to prevent reporting error touch sensitive events, the touch sensitive processing method above further includes: in step 650, when an area having the plurality of electrodes on the touch panel is determined to be covered by a large-area conductive liquid or object, refraining from reporting any touch sensitive events in that area.

Figure 7:
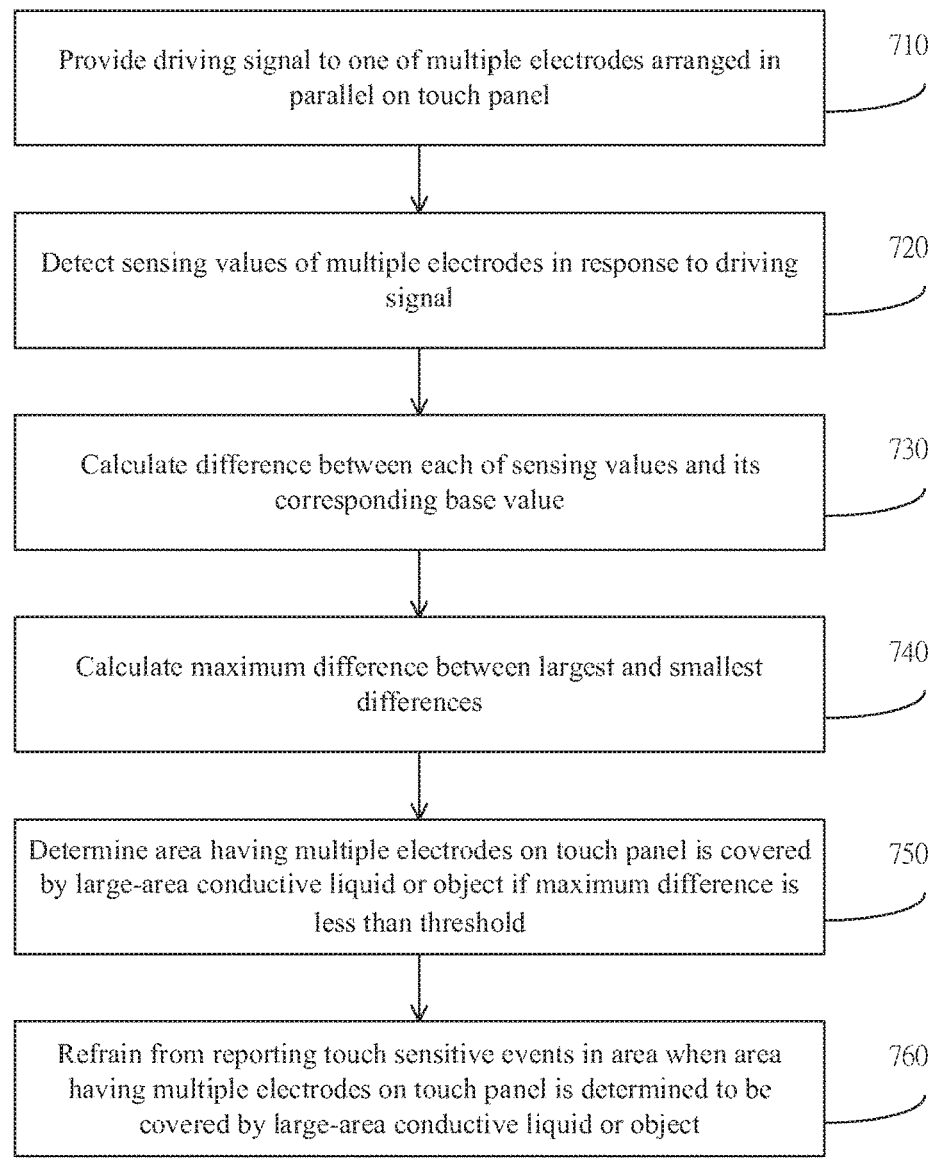
FIG. 7 is a flowchart illustrating a touch sensitive processing method in accordance with an embodiment of the present invention.

Referring to FIG. 7, a flowchart illustrating a touch sensitive processing method in accordance with an embodiment of the present invention is shown. The present application provides a touch sensitive processing method for detecting if a touch panel is mostly covered by a conductive liquid or object, which can be applicable to, for example, the touch sensitive processing apparatus 520 shown in FIG. 5, and the method includes the steps of: in step 710, providing a driving signal to one of a plurality of electrodes arranged in parallel on the touch panel; in step 720, detecting sensing values of the plurality of electrodes in response to the driving signal; in step 730, calculating a difference between each of the sensing values and its corresponding base value; in step 740, calculating a maximum difference between the largest difference and the smallest difference in the plurality of differences; and in step 750, determining that an area having the plurality of electrodes on the touch panel is covered by a large-area conductive liquid or object if the maximum difference is less than a threshold.

In order to prevent establishing base values while the touch panel is being covered, in an embodiment, the base values are established in at least one of the following time points: the base values are set up at a manufacturing factory of the touch sensitive processing apparatus; at power-on of the touch sensitive processing apparatus, the plurality of electrodes are sensed using the sensing circuit and the sensing values are used as the base values; and when the processor determines that the touch panel is not touched or near any external conductive object, the plurality of electrodes are sensed using the sensing circuit and the sensing values are used as the base values.

In order to increase the maximum difference or detect a larger area on the touch panel, the electrode driven by the driving signal can be selected as far away from the rest of the electrodes as possible, such that the difference between the amount of sensing from the furthest electrode and the amount of sensing from the closest electrode is maximized. Thus, in an embodiment, the electrode driven by the driving signal is at the outermost side of the plurality of electrodes. In order to detect a larger area on the touch panel, if only an electrode on one side is driven by the driving signal, then electrodes on the other side may not have any sensing value. Thus, in an embodiment, the touch sensitive processing method above further includes providing a driving signal to each of the outermost electrodes on both sides of the plurality of electrodes. In order to prevent reporting error touch sensitive events, the touch sensitive processing method above further includes: in step 760, when an area having the plurality of electrodes on the touch panel is determined to be covered by a large-area conductive liquid or object, refraining from reporting any touch sensitive events in that area.

Figure 8:
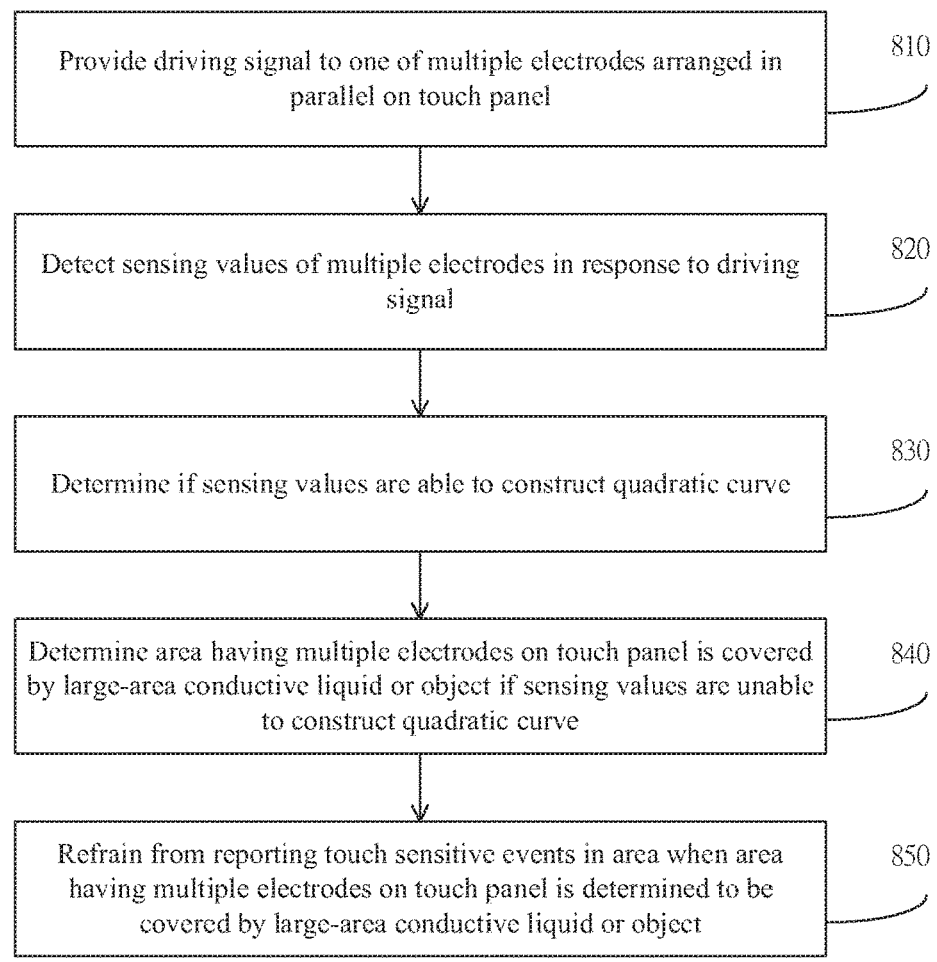
FIG. 8 is a flowchart illustrating a touch sensitive processing method in accordance with an embodiment of the present invention.

Referring to FIG. 8, a flowchart illustrating a touch sensitive processing method in accordance with an embodiment of the present invention is shown. The present application provides a touch sensitive processing method for detecting if a touch panel is mostly covered by a conductive liquid or object, which can be applicable to, for example, the touch sensitive processing apparatus 520 shown in FIG. 5, and the method includes the following steps of: in step 810, providing a driving signal to one of a plurality of electrodes arranged in parallel on the touch panel; in step 820, detecting sensing values of the plurality of electrodes in response to the driving signal; in step 830, determining if the sensing values are able to construct a quadratic curve; and in step 840, determining that an area having the plurality of electrodes on the touch panel is covered by a large-area conductive liquid or object if the sensing values are unable to construct a quadratic curve.

In order to avoid misjudgments, the touch sensitive processing method further includes: determining the curvature of the quadratic curve when the sensing values are able to construct a quadratic curve, and determining that an area having the plurality of electrodes on the touch panel is covered by a large-area conductive liquid or object if the curvature is less than a curvature threshold.

In order to increase the maximum difference or detect a larger area on the touch panel, the electrode driven by the driving signal can be selected as far away from the rest of the electrodes as possible, such that the difference between the amount of sensing from the furthest electrode and the amount of sensing from the closest electrode is maximized. Thus, in an embodiment, the electrode driven by the driving signal is at the outermost side of the plurality of electrodes. In order to detect a larger area on the touch panel, if only an electrode on one side is driven by the driving signal, then electrodes on the other side may not have any sensing value. Thus, in an embodiment, the touch sensitive processing method above further includes providing a driving signal to each of the outermost electrodes on both sides of the plurality of electrodes. In order to prevent reporting error touch sensitive events, the touch sensitive processing method above further includes: in step 850, when an area having the plurality of electrodes on the touch panel is determined to be covered by a large-area conductive liquid or object, refraining from reporting any touch sensitive events in that area.

Figure 9:
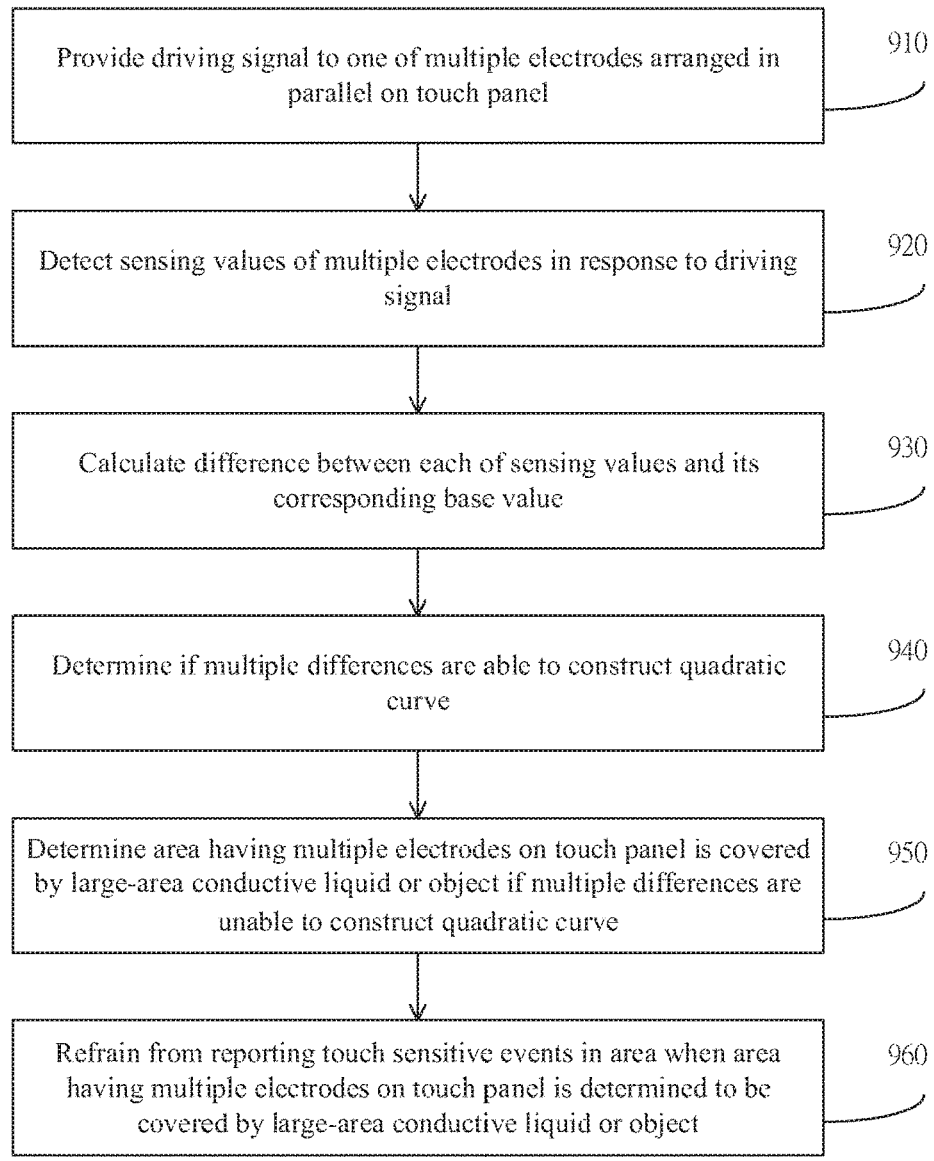
FIG. 9 is a flowchart illustrating a touch sensitive processing method in accordance with an embodiment of the present invention.

Referring to FIG. 9, a flowchart illustrating a touch sensitive processing method in accordance with an embodiment of the present invention is shown. The present application provides a touch sensitive processing method for detecting if a touch panel is mostly covered by a conductive liquid or object, which can be applicable to, for example, the touch sensitive processing apparatus 520 shown in FIG. 5, and the method includes the following steps of: in step 910, providing a driving signal to one of a plurality of electrodes arranged in parallel on the touch panel; in step 920, detecting sensing values of the plurality of electrodes in response to the driving signal; in step 930, calculating a difference between each of the sensing values and its corresponding base value; in step 940, determining if the differences are able to construct a quadratic curve; and in step 950, determining that an area having the plurality of electrodes on the touch panel is covered by a large-area conductive liquid or object if the differences are unable to construct a quadratic curve.

In order to avoid misjudgments, the touch sensitive processing method further includes: determining the curvature of the quadratic curve when the differences are able to construct a quadratic curve, and determining that an area having the plurality of electrodes on the touch panel is covered by a large-area conductive liquid or object if the curvature is less than a curvature threshold.

In order to increase the maximum difference or detect a larger area on the touch panel, the electrode driven by the driving signal can be selected as far away from the rest of the electrodes as possible, such that the difference between the amount of sensing from the furthest electrode and the amount of sensing from the closest electrode is maximized. Thus, in an embodiment, the electrode driven by the driving signal is at the outermost side of the plurality of electrodes. In order to detect a larger area on the touch panel, if only an electrode on one side is driven by the driving signal, then electrodes on the other side may not have any sensing value. Thus, in an embodiment, the touch sensitive processing method above further includes providing a driving signal to each of the outermost electrodes on both sides of the plurality of electrodes. In order to prevent reporting error touch sensitive events, the touch sensitive processing method above further includes: in step 960, when an area having the plurality of electrodes on the touch panel is determined to be covered by a large-area conductive liquid or object, refraining from reporting any touch sensitive events in that area.

The present application provides a touch sensitive electronic system, which can be, for example, the touch sensitive electronic system 500 shown in FIG. 5, and includes a touch panel and a touch sensitive processing apparatus, wherein the touch sensitive processing apparatus includes: a driving circuit for providing a driving signal to a plurality of first electrodes and a plurality of second electrodes arranged in parallel on the touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area, commanding the sensing circuit to detect a plurality of second sensing values of all of the second electrodes in that area, and determining at least one second-coordinate value based on the plurality of second sensing values; commanding the driving circuit to simultaneously provide a driving signal to all of the second electrodes in that area, commanding the sensing circuit to detect a plurality of first sensing values of all of the first electrodes in that area, and determining at least one first-coordinate value based on the plurality of first sensing values; and determining that there is an external conductive object at a location of the first-coordinate value and the second-coordinate value.

The present application provides a touch sensitive processing apparatus, which can be, for example, the touch sensitive processing apparatus 520 shown in FIG. 5, and includes: a driving circuit for providing a driving signal to a plurality of first electrodes and a plurality of second electrodes arranged in parallel on a touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area, commanding the sensing circuit to detect a plurality of second sensing values of all of the second electrodes in that area, and determining at least one second-coordinate value based on the plurality of second sensing values; commanding the driving circuit to simultaneously provide a driving signal to all of the second electrodes in that area, commanding the sensing circuit to detect a plurality of first sensing values of all of the first electrodes in that area, and determining at least one first-coordinate value based on the plurality of first sensing values; and determining that there is an external conductive object at a location of the first-coordinate value and the second-coordinate value.

In order for the touch sensitive processing apparatus to accept scaling gestures made by two fingers, the processor is further configured to: when two first-coordinate values and two second-coordinate values are detected, determine that there are two external conductive objects at two diagonal points of a rectangle formed by the two first-coordinate values and two second-coordinate values.

The present application provides a touch sensitive electronic system, which can be, for example, the touch sensitive electronic system 500 shown in FIG. 5, and includes a touch panel and a touch sensitive processing apparatus, wherein the touch sensitive processing apparatus includes: a driving circuit for providing a driving signal to a plurality of first electrodes and a plurality of second electrodes arranged in parallel on the touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area; commanding the sensing circuit to detect a plurality of first sensing values of all of the first electrodes in that area, and determining at least one first-coordinate value based on the plurality of first sensing values; commanding the sensing circuit to detect a plurality of second sensing values of all of the second electrodes in that area, and determining at least one second-coordinate value based on the plurality of second sensing values; and determining that there is an external conductive object at a location of the first-coordinate value and the second-coordinate value.

The present application provides a touch sensitive processing apparatus, which can be, for example, the touch sensitive processing apparatus 520 shown in FIG. 5, and includes: a driving circuit for providing a driving signal to a plurality of first electrodes and a plurality of second electrodes arranged in parallel on the touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area; commanding the sensing circuit to detect a plurality of first sensing values of all of the first electrodes in that area, and determining at least one first-coordinate value based on the plurality of first sensing values; commanding the sensing circuit to detect a plurality of second sensing values of all of the second electrodes in that area, and determining at least one second-coordinate value based on the plurality of second sensing values; and determining that there is an external conductive object at a location of the first-coordinate value and the second-coordinate value.

In order for the touch sensitive processing apparatus to accept scaling gestures made by two fingers, the processor is further configured to: when two first-coordinate values and two second-coordinate values are detected, determine that there are two external conductive objects at two diagonal points of a rectangle formed by the two first-coordinate values and two second-coordinate values.

The present application provides a touch sensitive electronic system, which can be, for example, the touch sensitive electronic system 500 shown in FIG. 5, and includes a touch panel and a touch sensitive processing apparatus, wherein the touch sensitive processing apparatus includes: a driving circuit for providing a driving signal to a plurality of first electrodes and a plurality of second electrodes arranged in parallel on the touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area; commanding the sensing circuit to detect a plurality of first sensing values of all of the first electrodes in that area, and determining at least one first-coordinate value based on the plurality of first sensing values; commanding the driving circuit to simultaneously provide a driving signal to all of the second electrodes in that area, commanding the sensing circuit to detect a plurality of second sensing values of all of the second electrodes in that area, and determining at least one second-coordinate value based on the plurality of second sensing values; and determining that there is an external conductive object at a location of the first-coordinate value and the second-coordinate value.

The present application provides a touch sensitive processing apparatus, which can be, for example, the touch sensitive processing apparatus 520 shown in FIG. 5, and includes: a driving circuit for providing a driving signal to a plurality of first electrodes and a plurality of second electrodes arranged in parallel on the touch panel; a sensing circuit for detecting sensing values of the plurality of first and second electrodes; and a processor for determining if an area having the plurality of first and second electrodes on the touch panel is covered by a large-area conductive liquid or object; when that area is determined to be covered by a large-area conductive liquid or object, commanding the driving circuit to simultaneously provide a driving signal to all of the first electrodes in that area; commanding the sensing circuit to detect a plurality of first sensing values of all of the first electrodes in that area, and determining at least one first-coordinate value based on the plurality of first sensing values; commanding the driving circuit to simultaneously provide a driving signal to all of the second electrodes in that area, commanding the sensing circuit to detect a plurality of second sensing values of all of the second electrodes in that area, and determining at least one second-coordinate value based on the plurality of second sensing values; and determining that there is an external conductive object at a location of the first-coordinate value and the second-coordinate value.

In order for the touch sensitive processing apparatus to accept scaling gestures made by two fingers, the processor is further configured to: when two first-coordinate values and two second-coordinate values are detected, determine that there are two external conductive objects at two diagonal points of a rectangle formed by the two first-coordinate values and two second-coordinate values.

Figure 10:
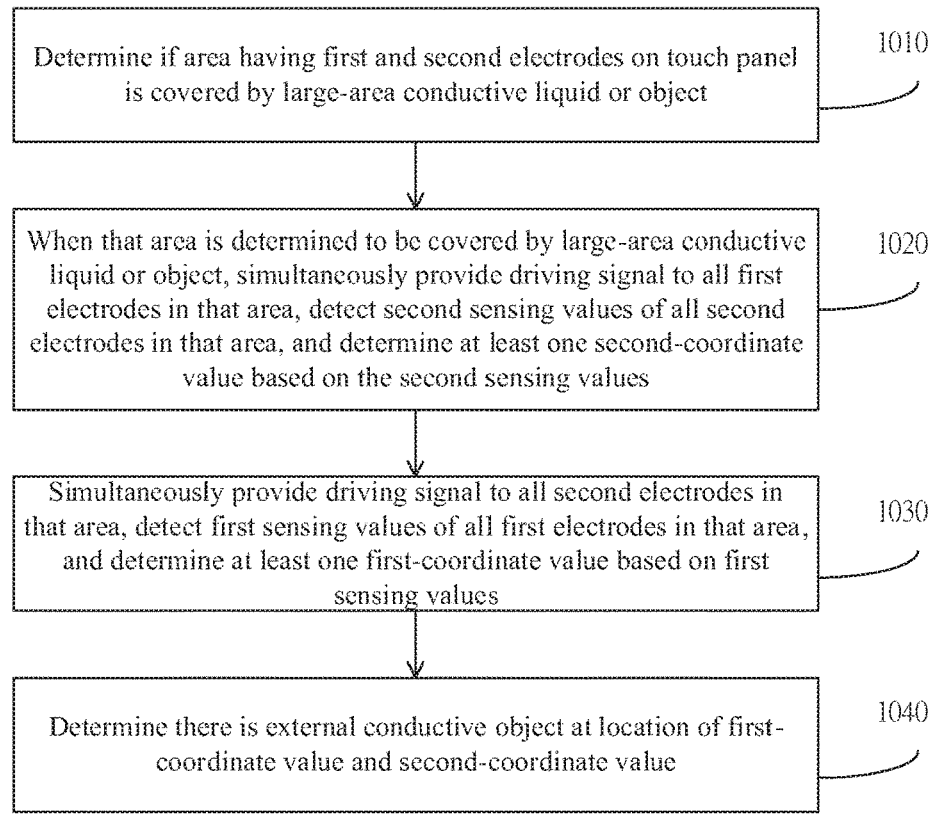
FIG. 10 is a flowchart illustrating a touch sensitive processing method in accordance with an embodiment of the present invention.

Referring to FIG. 10, a flowchart illustrating a touch sensitive processing method in accordance with present invention is shown. The present application provides a touch sensitive processing method, which can be applicable to, for example, the touch sensitive processing apparatus 520 shown in FIG. 5, and the method includes: in step 1010, determining if an area having a plurality of first and second electrodes on a touch panel is covered by a large-area conductive liquid or object; in step 1020, when that area is determined to be covered by a large-area conductive liquid or object, simultaneously providing a driving signal to all of the first electrodes in that area, detecting a plurality of second sensing values of all of the second electrodes in that area, and determining at least one second-coordinate value based on the plurality of second sensing values; in step 1030, simultaneously providing a driving signal to all of the second electrodes in that area, detecting a plurality of first sensing values of all of the first electrodes in that area, and determining at least one first-coordinate value based on the plurality of first sensing values; and in step 1040, determining that there is an external conductive object at a location of the first-coordinate value and the second-coordinate value.

In order for the touch sensitive processing apparatus to accept scaling gestures made by two fingers, the processor is further configured to: when two first-coordinate values and two second-coordinate values are detected, determine that there are two external conductive objects at two diagonal points of a rectangle formed by the two first-coordinate values and two second-coordinate values.

Figure 11:
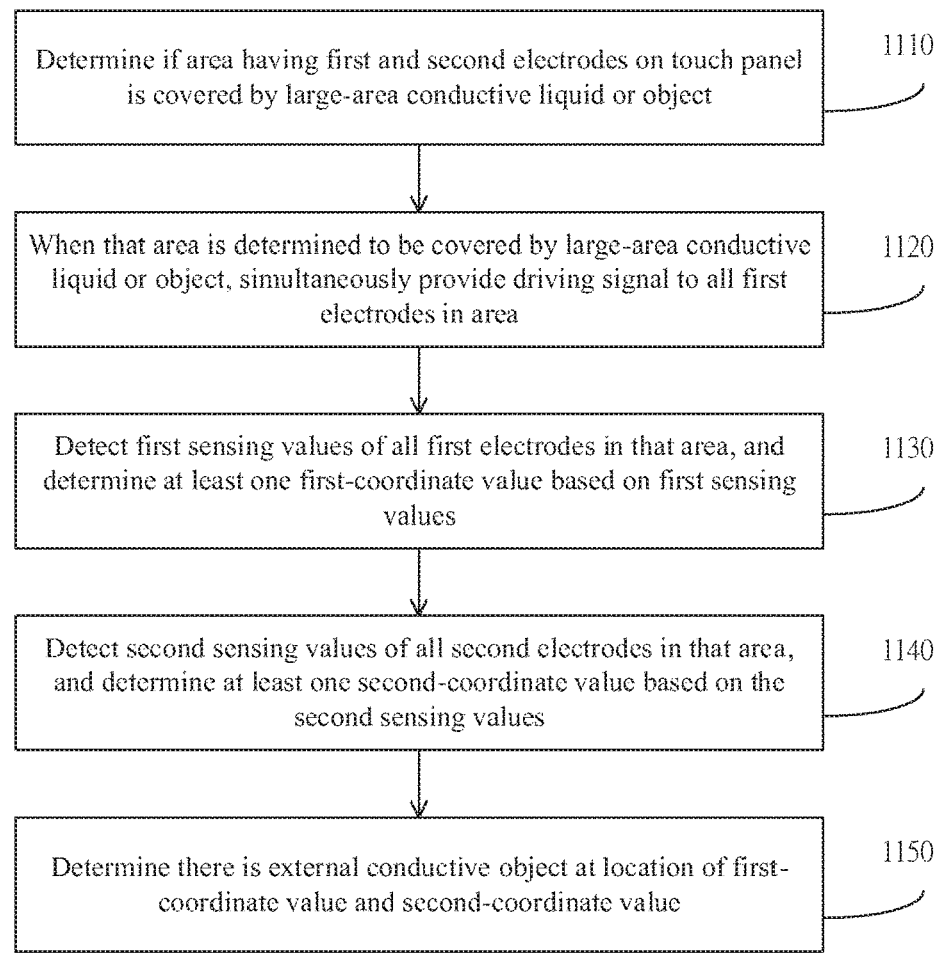
FIG. 11 is a flowchart illustrating a touch sensitive processing method in accordance with an embodiment of the present invention.

Referring to FIG. 11, a flowchart illustrating a touch sensitive processing method in accordance with present invention is shown. The present application provides a touch sensitive processing method, which can be applicable to, for example, the touch sensitive processing apparatus 520 shown in FIG. 5, and the method includes: in step 1110, determining if an area having a plurality of first and second electrodes on a touch panel is covered by a large-area conductive liquid or object; in step 1120, when that area is determined to be covered by a large-area conductive liquid or object, simultaneously providing a driving signal to all of the first electrodes in that area; in step 1130, detecting a plurality of first sensing values of all of the first electrodes in that area, and determining at least one first-coordinate value based on the plurality of first sensing values; in step 1140, detecting a plurality of second sensing values of all of the second electrodes in that area, and determining at least one second-coordinate value based on the plurality of second sensing values; and in step 1150, determining that there is an external conductive object at a location of the first-coordinate value and the second-coordinate value.

In order for the touch sensitive processing apparatus to accept scaling gestures made by two fingers, the processor is further configured to: when two first-coordinate values and two second-coordinate values are detected, determine that there are two external conductive objects at two diagonal points of a rectangle formed by the two first-coordinate values and two second-coordinate values.

Figure 12:
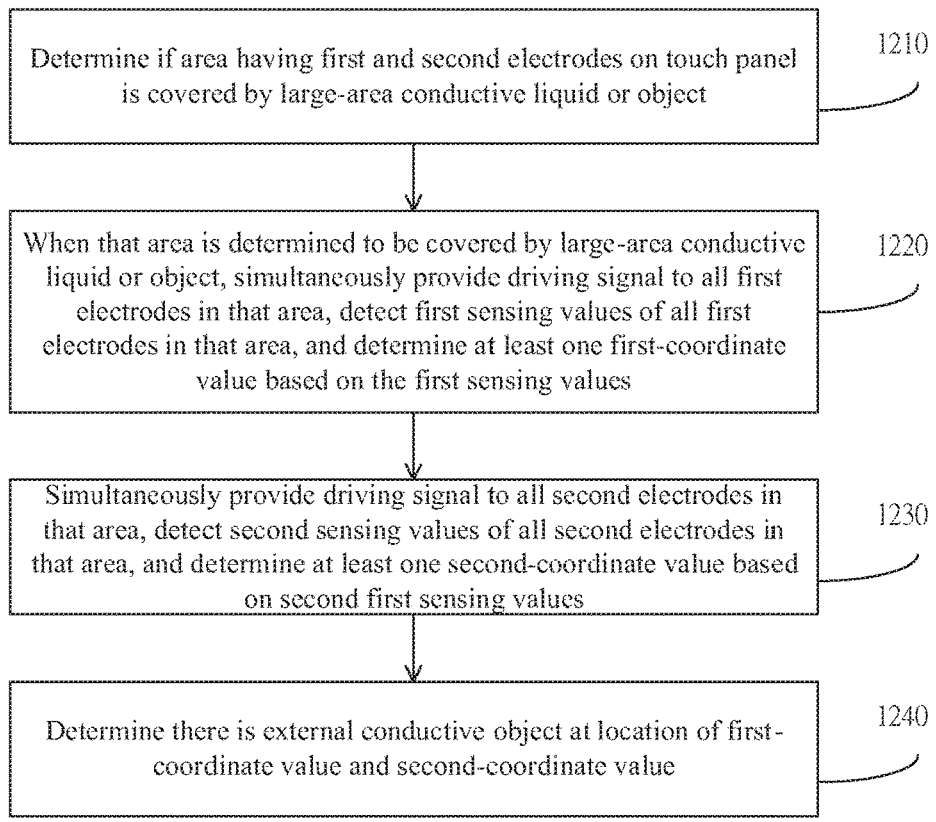
FIG. 12 is a flowchart illustrating a touch sensitive processing method in accordance with an embodiment of the present invention.

Referring to FIG. 12, a flowchart illustrating a touch sensitive processing method in accordance with present invention is shown. The present application provides a touch sensitive processing method, which can be applicable to, for example, the touch sensitive processing apparatus 520 shown in FIG. 5, and the method includes: in step 1210, determining if an area having a plurality of first and second electrodes on a touch panel is covered by a large-area conductive liquid or object; in step 1220, when that area is determined to be covered by a large-area conductive liquid or object, simultaneously providing a driving signal to all of the first electrodes in that area; detecting a plurality of first sensing values of all of the first electrodes in that area, and determining at least one first-coordinate value based on the plurality of first sensing values; in step 1230, simultaneously providing a driving signal to all of the second electrodes in that area, detecting a plurality of second sensing values of all of the second electrodes in that area, and determining at least one second-coordinate value based on the plurality of second sensing values; and in step 1240, determining that there is an external conductive object at a location of the first-coordinate value and the second-coordinate value.

In order for the touch sensitive processing apparatus to accept scaling gestures made by two fingers, the processor is further configured to: when two first-coordinate values and two second-coordinate values are detected, determine that there are two external conductive objects at two diagonal points of a rectangle formed by the two first-coordinate values and two second-coordinate values.

What is claimed is:

1. A touch sensitive electronic system for detecting if a touch panel is mostly covered by a conductive liquid or object, comprising:
   the touch panel; and
   a touch sensitive processing apparatus including:
      a driving circuit for providing a driving signal to one of a plurality of electrodes arranged in parallel on the touch panel;
      a sensing circuit for detecting sensing values of the plurality of electrodes in response to the driving signal; and
      a processor for commanding the driving circuit to provide the driving signal and receiving the sensing values from the sensing circuit; calculating a difference between each of the sensing values and its corresponding base value; determining if the differences are able to construct a quadratic curve; and determining that an area having the plurality of electrodes on the touch panel is covered by a large-area conductive liquid or object if the differences are unable to construct a quadratic curve.

2. A touch sensitive processing apparatus for detecting if a touch panel is mostly covered by a conductive liquid or object, comprising:
   a driving circuit for providing a driving signal to one of a plurality of electrodes arranged in parallel on the touch panel;
   a sensing circuit for detecting sensing values of the plurality of electrodes in response to the driving signal; and
   a processor for commanding the driving circuit to provide the driving signal and receiving the sensing values from the sensing circuit; calculating a difference between each of the sensing values and its corresponding base value; determining if the differences are able to construct a quadratic curve; and determining that an area having the plurality of electrodes on the touch panel is covered by a large-area conductive liquid or object if the differences are unable to construct a quadratic curve.

3. The touch sensitive processing apparatus of claim 2, wherein the processor is further configured to determine the curvature of the quadratic curve when the differences are able to construct a quadratic curve, and determine that an area having the plurality of electrodes on the touch panel is covered by a large-area conductive liquid or object if the curvature is less than a curvature threshold.

4. The touch sensitive processing apparatus of claim 2, wherein the electrode driven by the driving signal is at the outermost side of the plurality of electrodes.

5. The touch sensitive processing apparatus of claim 2, wherein the driving circuit provides a driving signal to each of the outermost electrodes on both sides of the plurality of electrodes.

6. A touch sensitive electronic system for detecting if a touch panel is mostly covered by a conductive liquid or object, comprising:
   the touch panel; and
   a touch sensitive processing apparatus including:
      a driving circuit for providing a driving signal to one of a plurality of electrodes arranged in parallel on the touch panel;

a sensing circuit for detecting sensing values of the plurality of electrodes in response to the driving signal; and a processor for commanding the driving circuit to provide the driving signal and receiving the sensing values from the sensing circuit, determining if the sensing values are able to construct a quadratic curve, and determining that an area having the plurality of electrodes on the touch panel is covered by a large-area conductive liquid or object if the sensing values are unable to construct a quadratic curve.

7. A touch sensitive processing apparatus for detecting if a touch panel is mostly covered by a conductive liquid or object, comprising:

a driving circuit for providing a driving signal to one of a plurality of electrodes arranged in parallel on the touch panel;

a sensing circuit for detecting sensing values of the plurality of electrodes in response to the driving signal; and a processor for commanding the driving circuit to provide the driving signal and receiving the sensing values from the sensing circuit, determining if the sensing values are able to construct a quadratic curve, and determining that an area having the plurality of electrodes on the touch panel is covered by a large-area conductive liquid or object if the sensing values are unable to construct a quadratic curve.

8. The touch sensitive processing apparatus of claim 7, wherein the processor is further configured to determine the curvature of the quadratic curve when the sensing values are able to construct a quadratic curve, and determine that an area having the plurality of electrodes on the touch panel is covered by a large-area conductive liquid or object if the curvature is less than a curvature threshold.

9. The touch sensitive processing apparatus of claim 7, wherein the electrode driven by the driving signal is at the outermost side of the plurality of electrodes.

10. The touch sensitive processing apparatus of claim 7, wherein the driving circuit provides a driving signal to each of the outermost electrodes on both sides of the plurality of electrodes.

11. The touch sensitive processing apparatus of claim 7, wherein when the processor determines that an area having the plurality of electrodes on the touch panel is covered by a large-area conductive liquid or object, it stops reporting any touch sensitive events in that area.

12. A touch sensitive processing method for detecting if a touch panel is mostly covered by a conductive liquid or object, comprising the following steps of:

providing a driving signal to one of a plurality of electrodes arranged in parallel on the touch panel;

detecting sensing values of the plurality of electrodes in response to the driving signal;

determining if the sensing values are able to construct a quadratic curve; and determining that an area having the plurality of electrodes on the touch panel is covered by a large-area conductive liquid or object if the sensing values are unable to construct a quadratic curve.

13. The touch sensitive processing method of claim 12, further comprising:

determining the curvature of the quadratic curve when the sensing values are able to construct a quadratic curve; and determining that an area having the plurality of electrodes on the touch panel is covered by a large-area conductive liquid or object if the curvature is less than a curvature threshold.

14. The touch sensitive processing method of claim 12, wherein the electrode driven by the driving signal is at the outermost side of the plurality of electrodes.

15. The touch sensitive processing method of claim 12, further comprising providing a driving signal to each of the outermost electrodes on both sides of the plurality of electrodes.

16. The touch sensitive processing method of claim 12, further comprising, when determining that an area having the plurality of electrodes on the touch panel is covered by a large-area conductive liquid or object, refraining from reporting any touch sensitive events in that area.

17. A touch sensitive processing method for detecting if a touch panel is mostly covered by a conductive liquid or object, comprising the following steps of:

providing a driving signal to one of a plurality of electrodes arranged in parallel on the touch panel;

detecting sensing values of the plurality of electrodes in response to the driving signal;

calculating a difference between each of the sensing values and its corresponding base value;

determining if the differences are able to construct a quadratic curve; and determining that an area having the plurality of electrodes on the touch panel is covered by a large-area conductive liquid or object if the differences are unable to construct a quadratic curve.

18. The touch sensitive processing method of claim 17, further comprising:

determining the curvature of the quadratic curve when the differences are able to construct a quadratic curve; and determining that an area having the plurality of electrodes on the touch panel is covered by a large-area conductive liquid or object if the curvature is less than a curvature threshold.

19. The touch sensitive processing method of claim 17, wherein the electrode driven by the driving signal is at the outermost side of the plurality of electrodes.

20. The touch sensitive processing method of claim 17, further comprising providing a driving signal to each of the outermost electrodes on both sides of the plurality of electrodes.

21. The touch sensitive processing method of claim 17, further comprising, when determining that an area having the plurality of electrodes on the touch panel is covered by a large-area conductive liquid or object, refraining from reporting any touch sensitive events in that area.

* * * * *